(12) United States Patent
Schmodde et al.

(10) Patent No.: US 8,702,172 B2
(45) Date of Patent: Apr. 22, 2014

(54) VEHICLE SEAT FOR A MOTOR VEHICLE

(75) Inventors: Hans Schmodde, Boeblingen (DE); Stefan Josten, Rommerskirchen (DE); Stuart Woolston, Glasgow (GB); Peter Lekat, Koeln-Seeberg (DE)

(73) Assignee: Johnson Controls Technology Company, Holland, MI (US)

( * ) Notice: Subject to any disclaimer, the term of this patent is extended or adjusted under 35 U.S.C. 154(b) by 573 days.

(21) Appl. No.: 12/670,967

(22) PCT Filed: Jul. 14, 2008

(86) PCT No.: PCT/EP2008/005727
§ 371 (c)(1),
(2), (4) Date: Jul. 22, 2010

(87) PCT Pub. No.: WO2009/015759
PCT Pub. Date: Feb. 5, 2009

(65) Prior Publication Data
US 2010/0295355 A1  Nov. 25, 2010

(30) Foreign Application Priority Data

Aug. 2, 2007 (DE) .......................... 10 2007 036 600
Aug. 9, 2007 (DE) .......................... 10 2007 037 714
Dec. 10, 2007 (DE) .......................... 10 2007 059 641

(51) Int. Cl.
*B60N 2/02* (2006.01)

(52) U.S. Cl.
USPC ................ 297/378.14; 297/378.12; 297/383; 296/65.09; 296/65.16; 296/66

(58) Field of Classification Search
USPC ............ 297/378.12, 378.14, 15, 354.12, 383, 297/334, 336; 296/66, 69, 65.16, 65.17, 296/65.09
See application file for complete search history.

(56) References Cited

U.S. PATENT DOCUMENTS

| | | | |
|---|---|---|---|
| 4,322,052 A * | 3/1982 | Hodge et al. ................... | 248/420 |
| 4,368,916 A | 1/1983 | Blasin | |
| 4,805,953 A * | 2/1989 | Yamauchi ................... | 296/65.09 |
| 5,482,349 A | 1/1996 | Richter et al. | |
| 5,941,591 A * | 8/1999 | Tsuge et al. ............... | 296/65.09 |
| 5,997,090 A * | 12/1999 | Baloche et al. ........... | 297/367 R |
| 6,070,934 A | 6/2000 | Schaefer et al. | |
| 6,328,381 B1 * | 12/2001 | Smuk ........................... | 297/365 |

(Continued)

FOREIGN PATENT DOCUMENTS

| | | |
|---|---|---|
| DE | 2848268 A1 | 5/1979 |
| DE | 9402767 U1 | 4/1994 |

(Continued)

OTHER PUBLICATIONS

International Search Report for application No. PCT/EP2008/005727 mailed Sep. 24, 2008.

(Continued)

*Primary Examiner* — David E Allred
(74) *Attorney, Agent, or Firm* — Fletcher Yoder P.C.

(57) ABSTRACT

A vehicle seat, such as a rear bench seat, includes a seat part, a backrest part and a fitting part. The backrest part and the fitting part are pivotable relative to the vehicle body about a first rotational axis. The first rotational axis is disposed below the seat part or behind the backrest part.

11 Claims, 7 Drawing Sheets

(56) References Cited

U.S. PATENT DOCUMENTS

| | | | |
|---|---|---|---|
| 6,464,299 B1 * | 10/2002 | Castagna | 297/378.12 |
| 6,513,875 B1 * | 2/2003 | Gray et al. | 297/378.14 |
| 7,025,422 B2 * | 4/2006 | Fast | 297/378.14 |
| RE39,315 E * | 10/2006 | Kamida et al. | 296/63 |
| 7,137,666 B2 * | 11/2006 | Haladuda et al. | 297/378.12 |
| 7,413,232 B1 * | 8/2008 | Fukui et al. | 296/65.09 |
| 7,850,220 B2 * | 12/2010 | Holdampf | 296/65.13 |
| 7,997,653 B2 * | 8/2011 | Szybisty et al. | 297/336 |
| 8,066,325 B2 * | 11/2011 | Holdampf | 297/284.4 |
| 8,182,040 B2 * | 5/2012 | Muller et al. | 297/378.11 |
| 8,186,758 B2 * | 5/2012 | Maier et al. | 297/334 |
| 2005/0212340 A1 * | 9/2005 | Fast | 297/378.12 |
| 2005/0212341 A1 * | 9/2005 | Coughlin et al. | 297/378.12 |
| 2005/0248197 A1 * | 11/2005 | Hofmann et al. | 297/367 |
| 2006/0055223 A1 * | 3/2006 | Thiel et al. | 297/378.12 |

FOREIGN PATENT DOCUMENTS

| | | | | |
|---|---|---|---|---|
| DE | 69015308 T2 | 5/1995 | | |
| DE | 19954687 A1 | 8/2001 | | |
| DE | 10054428 A1 | 5/2002 | | |
| DE | 69806472 T2 | 1/2003 | | |
| DE | 10244695 A1 | 4/2004 | | |
| DE | 102004011137 A1 | 9/2005 | | |
| DE | 202006004326 U1 | 7/2006 | | |
| EP | 205409 A1 * | 12/1986 | | B60N 1/02 |
| EP | 211248 A2 * | 2/1987 | | B60N 1/10 |
| EP | 0422527 A1 | 4/1991 | | |
| EP | 1048510 A1 | 11/2000 | | |
| FR | 2547183 A3 * | 12/1984 | | A47C 17/16 |
| GB | 2095984 A * | 10/1982 | | B60N 1/06 |
| JP | 2004512878 | 4/2004 | | |
| JP | 2006500278 | 1/2006 | | |
| WO | 2004060712 | 7/2004 | | |

OTHER PUBLICATIONS

German Examination Report dated Jul. 1, 2010.
Japanese Office Action dated Nov. 27, 2012.
European Search Report dated Oct. 30, 2013.

* cited by examiner

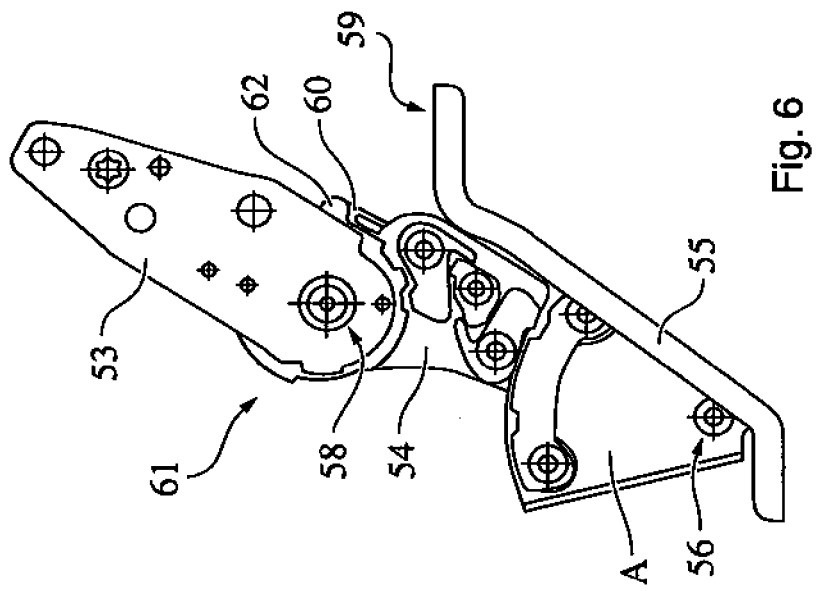
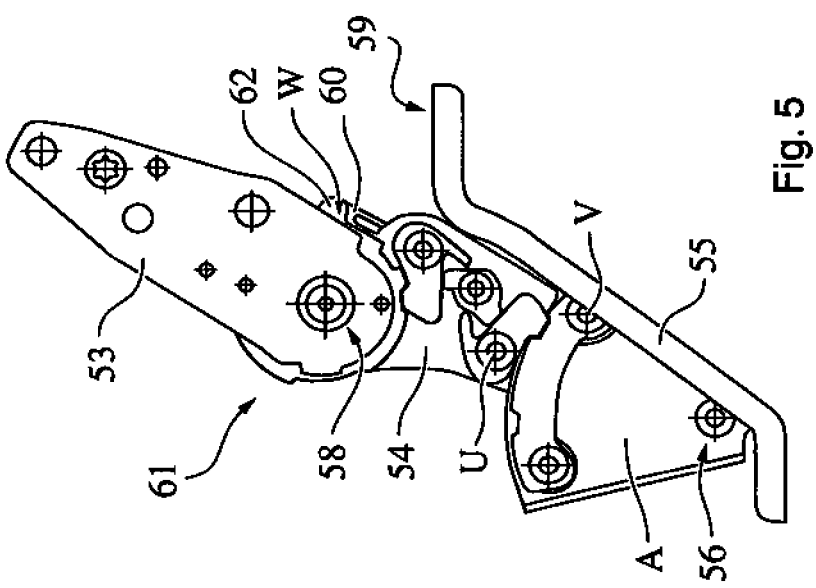

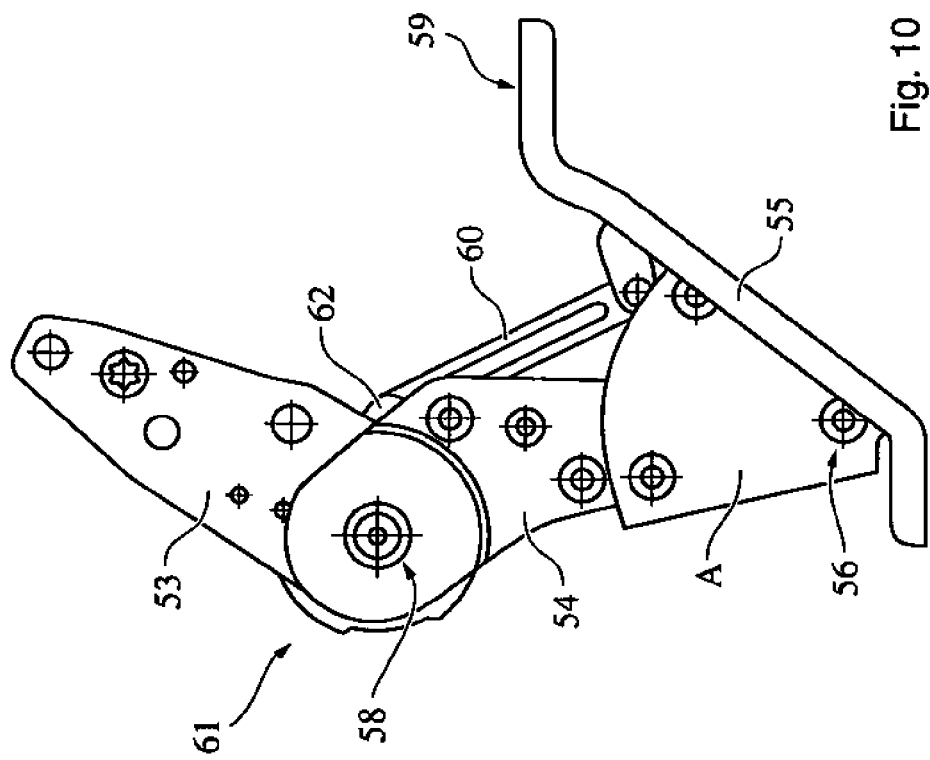
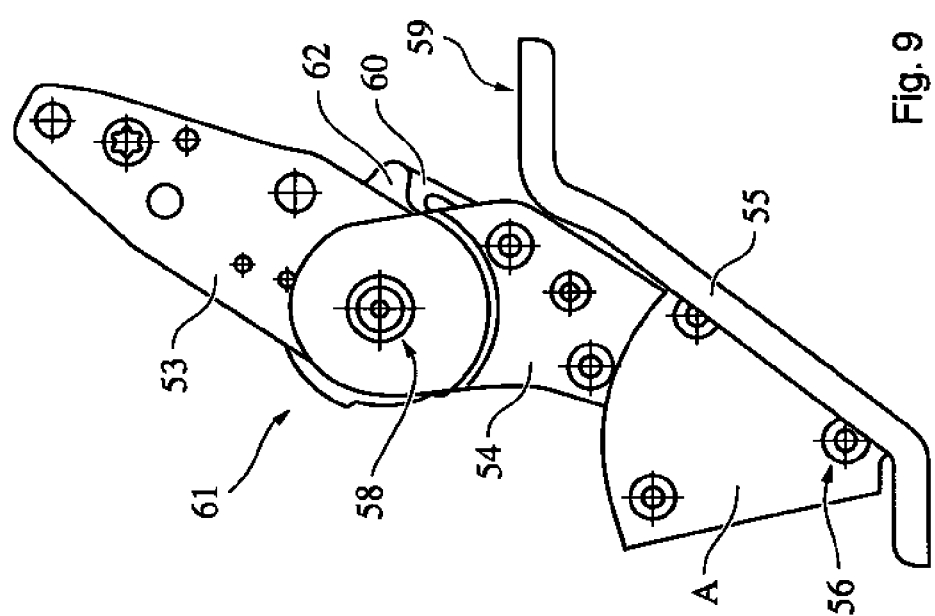

VEHICLE SEAT FOR A MOTOR VEHICLE

CROSS REFERENCE TO RELATED APPLICATIONS

This application claims priority from and the benefit of PCT Application No. PCT/EP2008/005727, filed on Jul. 14, 2008; German Patent No. DE 10 2007 036 600.2, filed on Aug. 2, 2007; German Patent No. DE 10 2007 037 714.4, filed on Aug. 9, 2007; and German Patent DE 10 2007 059 641.5, filed on Dec. 10, 2007; all entitled "Vehicle Seat for a Motor Vehicle", which are herein incorporated by reference.

BACKGROUND

The invention relates to a vehicle seat and/or an inclination adjuster for the backrest of a motor vehicle.

Vehicle seats comprising inclination adjusters for the backrest are generally known. Such devices are known in principle, for example, from the publications U.S. Pat. No. 5,482,349 A, EP 0 422 527 A1, DE 20 2006 004 326 U1, EP 1 048 510 B1, DE 199 54 687 A1, DE 100 54 428 A1, DE 94 02 767 U1, DE 28 48 268 C2, DE 102 44 695 B4, DE 10 2004 011 137 A1 and DE 698 06 472 T2.

In terms of increasing the loading space, however, the known vehicle seats are disadvantageous when operated for adjusting an increase in the loading space and in terms of the weight of the vehicle seat.

SUMMARY

It was the object of the present invention, therefore, to provide a vehicle seat in which, by simple structural means of the vehicle seat and, in particular, with a low weight of the vehicle seat, a loading position of the backrest may be adopted such that the backrest is moved forward and simultaneously raised, in combination with a one-handed operation.

The object is achieved by a vehicle seat, in particular a rear seat bench, having a seat part, a backrest part and a fitting part, the backrest part and the fitting part being provided in a pivotable fashion relative to the vehicle body about a first rotational axis, and the first rotational axis being disposed below the seat part or behind the backrest part. By the term "below the seat part" is understood, in particular, within the meaning of the present invention that the first rotational axis is arranged markedly below a plane of a seating surface of the seat part, for example more than 100 mm below this plane of the seating surface in the normal position of the seat part, the so-called design position of the seat part. According to the invention, by varying the location of the first rotational axis, it is advantageously possible in a structurally simple manner to achieve almost any desired adjustment of the backrest part when folding down and/or pivoting the backrest part and the fitting part about the first rotational axis, which may be carried out in a simple and mechanically very stable manner and merely by a small angle. In particular, according to the invention, by moving forward the location of the first rotational axis it is possible to bring about a folding down of the fitting part together with the backrest part by, for example, 20° or by, for example, 25° or by, for example, 30° which leads to the raising of the backrest part over the seat part, such that it is possible to move the backrest part forward considerably by, for example, 100 mm and thus a significant gain of space behind the backrest part, i.e. generally in the region of a luggage space and/or loading space, is possible. By the term "behind the backrest part" is understood within the meaning of the present invention, in particular, that the first rotational axis is arranged markedly behind a plane of a seating surface or leaning surface of the backrest part, for example more than 100 mm behind this plane in the normal position of the backrest part, the so-called design position of the backrest part, in particular a positioning of the first rotational axis obliquely upwards to the rear relative to the lower end of the backrest part being provided according to the invention as an alternative to a positioning below the seat part.

According to the invention, it is further preferred that the backrest part is provided to be pivotable relative to the fitting part about a second rotational axis, an inclination adjustment fitting being provided, in particular, between the fitting part and the backrest part, in particular an adjustment fitting with a wobble mechanism and/or a latching fitting. As a result, it is possible advantageously to permit a comfort adjustment of the backrest part in a region about its design position.

According to the invention, it is further preferred that the second rotational axis is arranged above the first rotational axis, in particular in the region of a plane of a seating surface of the seat part or above a plane of a seating surface of the seat part. As a result, the comfort requirements of a user of the vehicle seat are advantageously taken into account. Moreover, by such an arrangement of the second rotational axis it may also be achieved that with a pivoting motion of the backrest part, such that said backrest part is adjusted substantially horizontally, a substantially planar extension of the loading space floor is possible.

Moreover, it is preferred according to the invention that a rotational adjustment of the fitting part about the first rotational axis is provided in a first position and in a second position relative to the vehicle body, the first position corresponding to a comfort position and the second position corresponding to a loading position. By the possibility of adjusting the loading position it is advantageously possible according to the invention to achieve a considerable increase in the loading space volume.

According to the invention, it is further preferred if the rotational adjustment of the fitting part about the first rotational axis is able to be latched in the first position and in the second position and/or that the fitting part is pretensioned by means of a spring device in the direction of the second position. As a result, it is advantageously possible in a simple but robust manner and in terms of weight, to achieve at any time a defined adjustment of the vehicle seat and its components, in particular of the backrest part together with the fitting part, so that a so-called misuse situation (i.e. situations which are caused by a deliberate or inadvertent faulty operation on the part of the vehicle seat user) are avoided or at least reduced.

According to the invention, it is further preferred that the relative position of the backrest part to the fitting part is provided to be substantially unaltered when pivoting about the first rotational axis, that the backrest part in the first position of the fitting part is provided adjusted about the first rotational axis substantially with a comfort adjustment of the inclination, and in that the backrest part in the second position of the fitting part is provided adjusted substantially vertically about the first rotational axis, the comfort adjustment of the inclination corresponding, in particular, to an adjustment of approximately 20° to 40°, preferably of approximately 25° to approximately 35° away from the vertical. As a result, additionally a simple, lightweight and nevertheless robust design of the pivoting functionality of the backrest part of the vehicle seat may advantageously be achieved and furthermore the likelihood of a so-called misuse situation may also be reduced.

According to the invention, it is further preferred that the rotational adjustment of the backrest part relative to the vehicle body when pivoting the fitting part about the first rotational axis is also provided substantially unaltered, that the backrest part is provided in the first position and in the second position of the fitting part adjusted about the first rotational axis, substantially with a comfort adjustment of the inclination, the comfort adjustment of the inclination corresponding, in particular, to an adjustment of approximately 20° to 40°, preferably of approximately 25° to approximately 35°, away from the vertical. As a result, additionally a simple, lightweight and nevertheless robust design of the pivoting functionality of the backrest part of the vehicle seat may advantageously be achieved, a normal use of the seat being possible both in the first position and in the second position, in the second position of the backrest part the increase in loading space leading to a specific reduction of the seating surface on the seat part which does not have to be disadvantageous, however, in particular for smaller people, namely children, or even for specific usage situations, namely equipping with a child seat or a baby seat. In this manner, the number of variants of possibilities for use of the vehicle seat according to the invention and/or of the vehicle comprising a vehicle seat according to the invention may be increased, so that overall the usability for a user is increased.

According to the invention, it is further preferred that when pivoting the fitting part about the first rotational axis an alteration of the rotational adjustment of the backrest part is provided relative to the vehicle body by an angle in the range of approximately 1° to approximately 140°, preferably either by an angle in the range of 3° to approximately 30° or by an angle in the range of approximately 110° to approximately 140°, the backrest part in the first position of the fitting part being provided adjusted about the first rotational axis substantially with a comfort adjustment of the inclination, the comfort adjustment of the inclination, in particular, corresponding to an adjustment of approximately 20° to 40°, preferably of approximately 25° to approximately 35°, away from the vertical. As a result, relative to the comfort adjustment of the inclination, other adjustments of the backrest part may advantageously also be provided which correspond to the second position of the fitting part. In this case, a four bar linkage is provided between the fitting part and a part of the inclination adjustment fitting, the four bar linkage not being configured as a parallelogram.

Moreover, according to the invention it is further advantageous if the fitting part forms a four bar linkage together with a pivot lever and a part of the inclination adjustment fitting, the four bar linkage being able to be locked, in particular, by means of a first and a second locking and unlocking device, in particular in the first and the second position of the fitting part, it being further provided, in particular, that the four bar linkage is configured substantially as a parallelogram, so that it leads to a pivoting of the backrest part which is fixed in its rotational position (and/or fixed in its rotational adjustment) relative to the vehicle body in the event of a pivoting of the fitting part about the first rotational axis. As a result, it is possible particularly advantageously that a simple, lightweight and nevertheless robust design of the pivoting functionality of the fitting part may be achieved with a fixed rotational position of the backrest part of the vehicle seat and further the likelihood of a so-called misuse situation may also be reduced, as unlocking of the inclination adjustment fitting between the fitting part and the backrest part is, in particular, not required.

According to the present invention, it is also advantageous that the rotational adjustment of the backrest part relative to the fitting part is provided about the second rotational axis in a third position and in a fourth position, the third position corresponding to a normal position and the fourth position corresponding to a folded position. As a result, a further increase in the flexibility in the use of the vehicle seat and/or of the vehicle is achieved with a vehicle seat according to the invention.

Moreover, it is preferred according to the invention that the rotational adjustment of the backrest part relative to the fitting part about the second rotational axis in the normal position may be adjusted in a comfort adjustment range either continuously into different positions or it may be adjusted into a plurality of positions. As a result, advantageously a use of the vehicle seat which is particularly tailored to the comfort requirements of a user may be possible.

It is particularly preferred that the seat part is fixedly arranged relative to the vehicle body. As a result, according to the invention a particularly lightweight yet stable construction of the vehicle seat may be achieved and yet a high degree of flexibility may be achieved from the point of view of comfort and regarding an increase in the loading space. With a seat part which is fixed relative to the vehicle body, in this case it is meant within the meaning of the present invention that at least the main structural parts of the seat part are configured to be fixed relative to the vehicle body. In contrast, for example, upholstered parts of the seat part may either be removable or even movably arranged relative to the vehicle body.

DRAWINGS

An embodiment of the invention is described in a little more detail hereinafter, with reference to the accompanying drawings, in which:

FIGS. 5 to 10 show an articulation device for a vehicle seat according to a second embodiment in different adjusted positions and from different sides.

DETAILED DESCRIPTION

Figure 1:
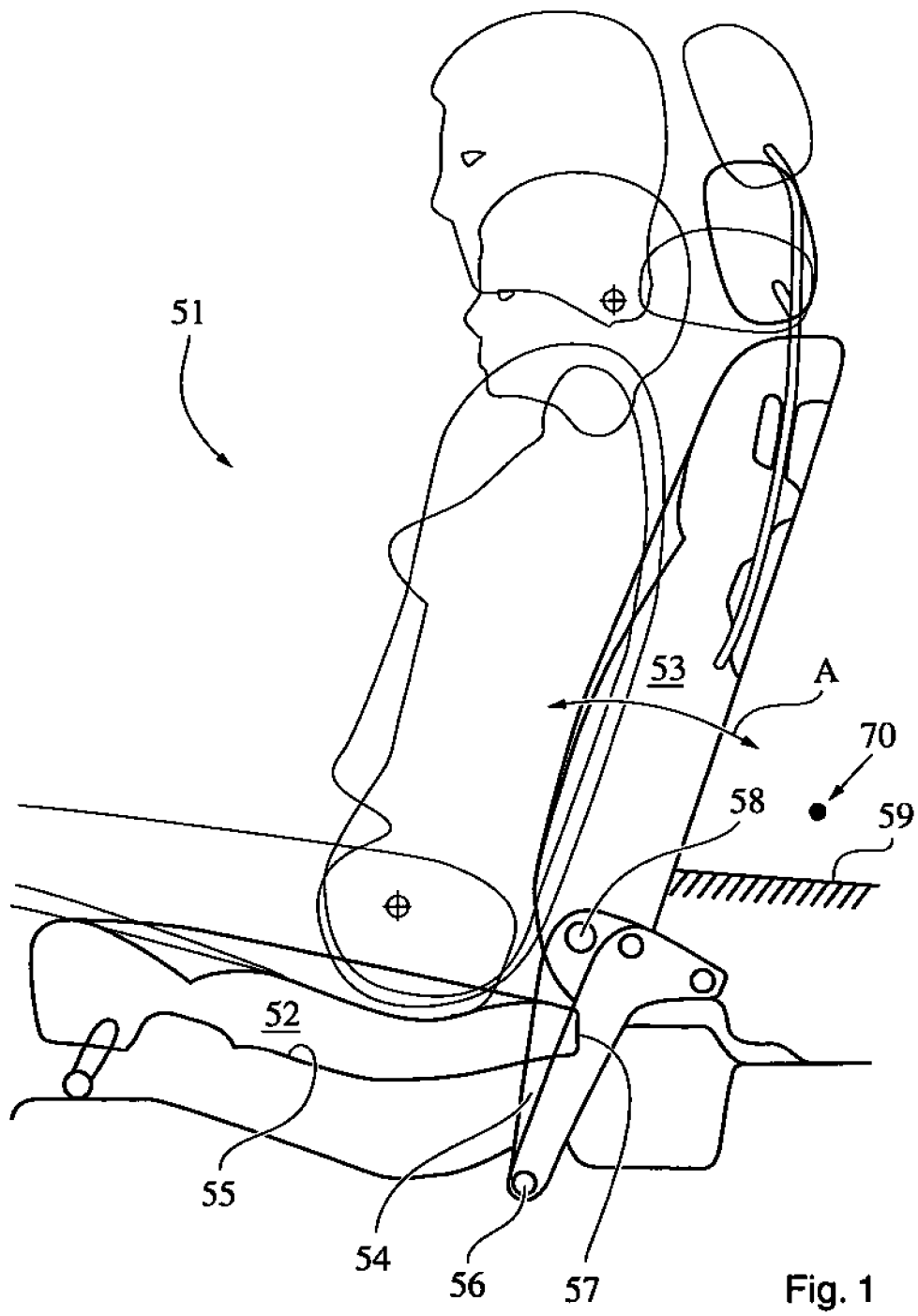
FIGS. 1 and 2 show a first embodiment of a vehicle seat according to the invention in a side schematic view in two different positions.

The vehicle seat 51 shown in FIG. 1 in the position of use according to a first embodiment of the present invention comprises a seat part 52 fixed to the vehicle body, and a backrest 53 and/or a backrest part 53. The backrest 53 and/or the backrest part 53 is connected via a fitting part 54 (which hereinafter is also denoted as an articulation device 54) to the vehicle floor 55 and/or to the vehicle body 55. The fitting part 54 has a first rotational axis 56 on the vehicle floor (and/or relative to the vehicle floor 55 or relative to the vehicle body 55) below the seat part 52. Said rotational axis is arranged displaced to the front relative to the upper edge of the backrest 53, i.e. in the direction of travel (X-direction of a conventional motor vehicle coordinate system). This applies equally to the second embodiment of the vehicle seat 51 which is shown substantially with reference to the fitting part 53 in FIGS. 5 to 10.

Figure 2:
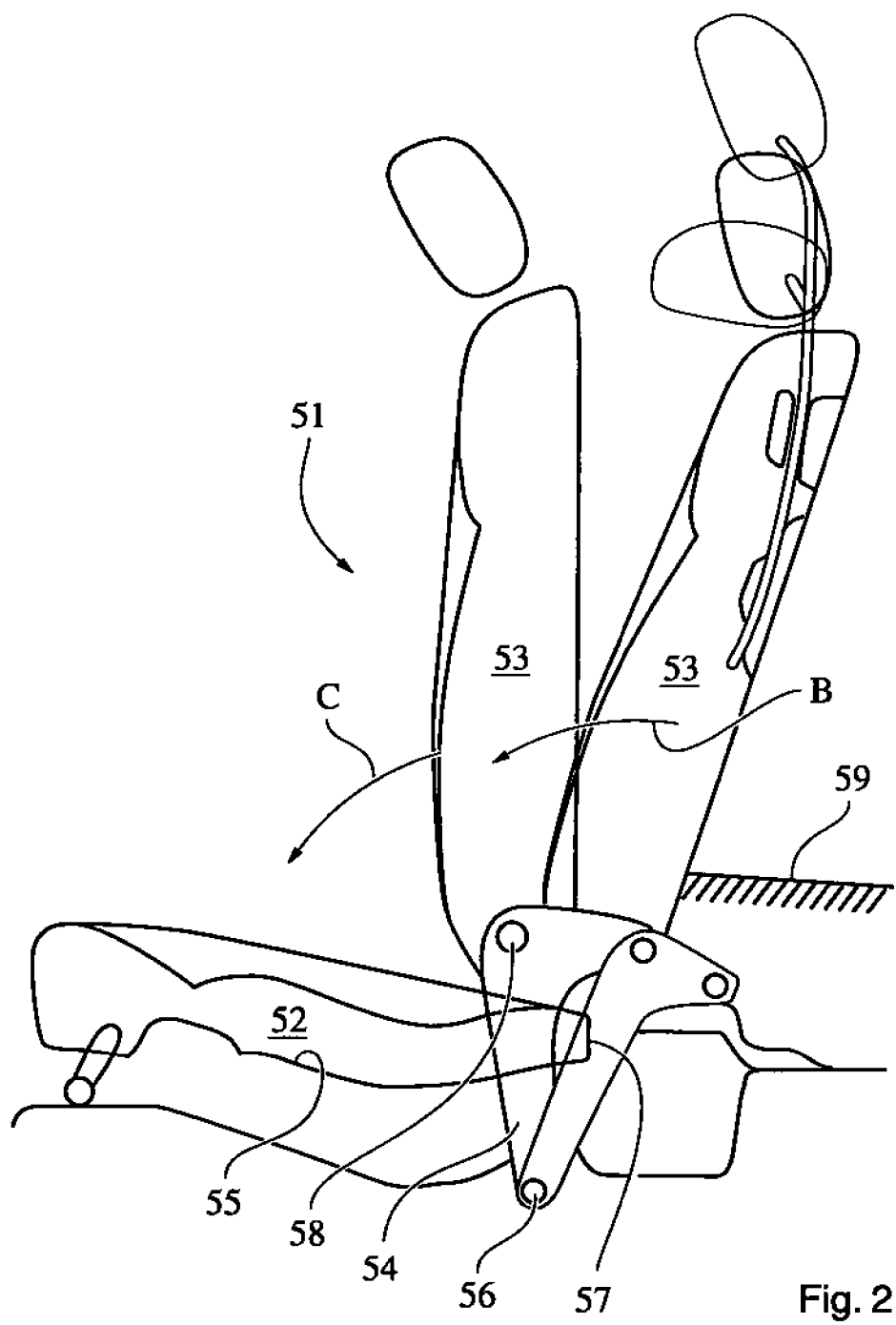
Figure 3:
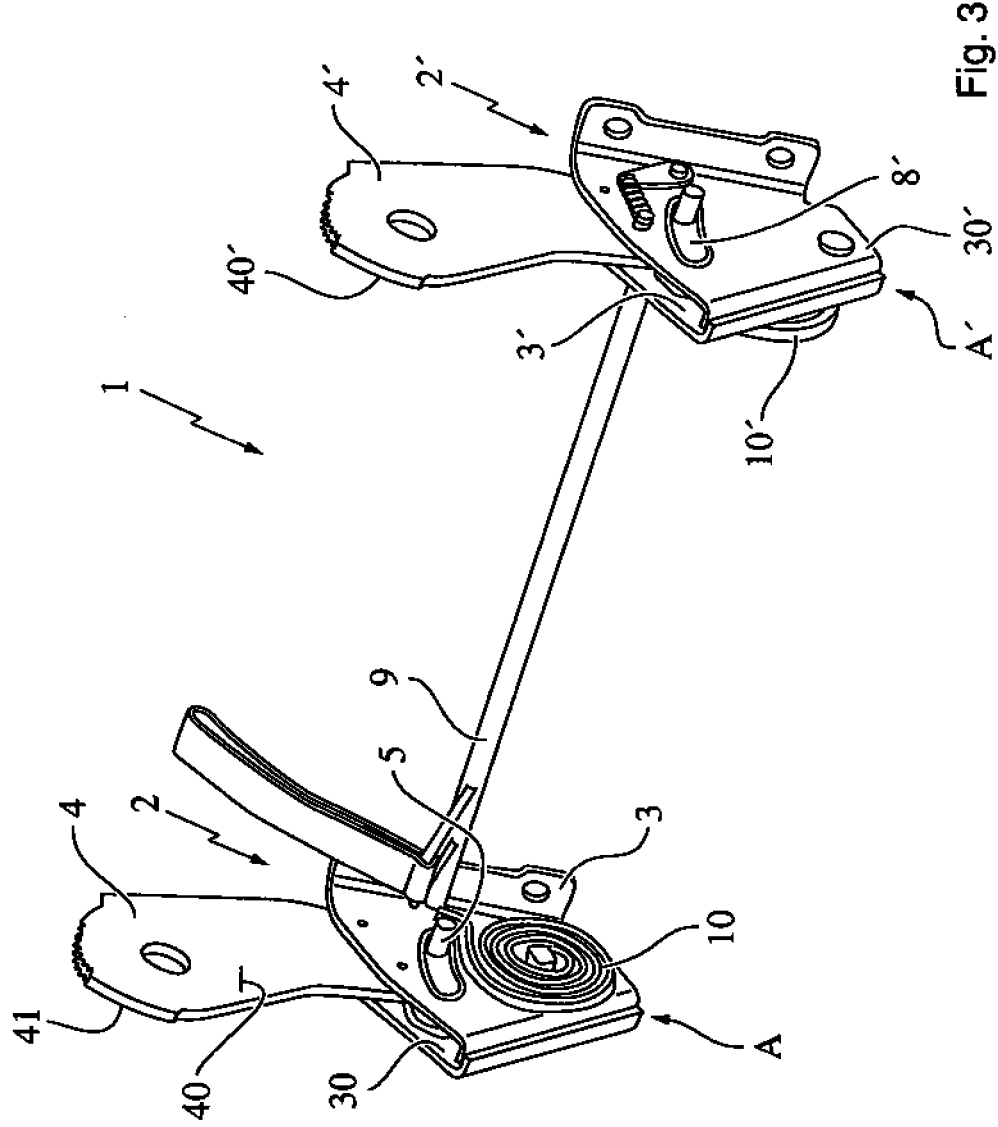
FIG. 3 shows an inclination adjuster for a vehicle seat according to the first embodiment in a perspective schematic view.
Figure 4:
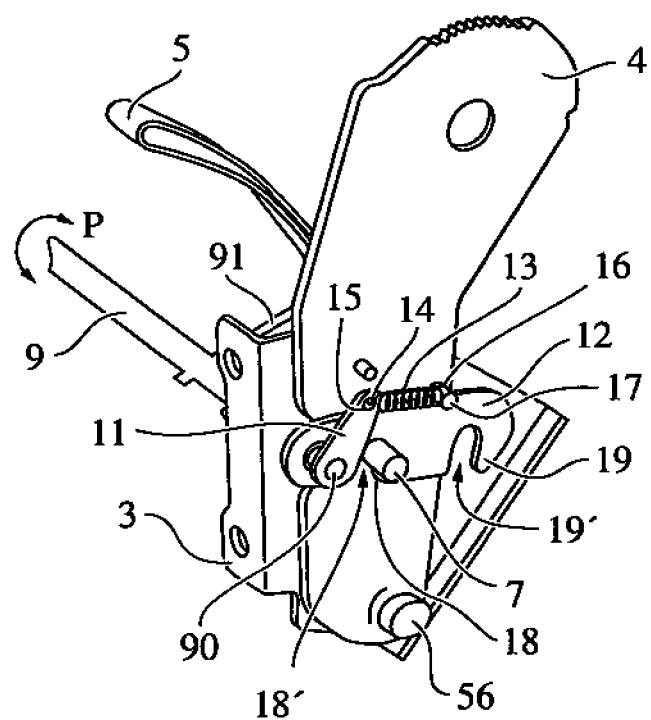
FIG. 4 shows an articulation device for a vehicle seat according to the first embodiment with the outer flank plates removed in a schematic view.

After releasing a locking element, not shown in FIGS. 1 and 2, but described in more detail in FIGS. 3 and 4, the backrest 53 in the first embodiment shown in FIGS. 1 and 2, together with the fitting part 54 (i.e. the backrest 53 is connected fixedly in terms of rotation relative to the fitting part 54 during the pivoting, and maintains its rotational position and/or rotational adjustment relative to the fitting part 54) may be pivoted (arrow B) from its design position inclined to the rear (subsequently also denoted as the first position of the fitting part 54 and/or the backrest 53) in the direction of travel into a first loading position slightly inclined to the front and shown in FIG. 2 (subsequently also denoted as the second position of the fitting part 54 and/or the backrest 53).

The backrest 53 is displaced by the arrangement of the first rotational axis 56 in the first region of this pivoting motion not only in the X-direction but at the same time is also raised (displacement in the Z-direction). By this upwards movement, a collision with the rear edge 57 of the seat part 52 is avoided. This applies both to the first and also the second embodiment of the vehicle seat 51.

Moreover, it applies both to the first and to the second embodiment of the vehicle seat 51 that the fitting part 54 further has a second rotational axis 58 with the backrest 53, which is spaced apart relative to the first rotational axis 56 away from the vehicle floor. The second rotational axis 58 which may also be fixed—in particular via an inclination adjustment fitting not shown in detail—serves for adjusting different comfort positions of the backrest inclination (arrow A in FIG. 1) and/or for folding forward the backrest 53, in particular from the first loading position (arrow C in FIG. 2, subsequently also denoted as the third position of the vehicle seat and/or of the backrest part 53 relative to the fitting part 54) into a substantially horizontal adjustment of the backrest 53 (subsequently also denoted as the fourth position of the vehicle seat and/or of the backrest 53 relative to the fitting part 54). From this fourth position or location, the backrest 53 may optionally be displaced again slightly to the rear (and in particular in the second embodiment) substantially parallel by rotating the fitting part 54 in both rotational axes 56, 58, in order to close a possible gap with the loading floor 59 of the vehicle, which is located to the rear.

FIG. 3 shows an inclination adjuster 1 for a motor vehicle seat 51 according to the invention (for example according to FIGS. 1 and 2) according to the first embodiment in a preferred variant. By means of the inclination adjuster 1, the inclination of the backrest 53 may be adjusted relative to the seat part 52 and/or relative to the vehicle body 55. The inclination adjuster 1 comprises a left-hand articulation device 2 and a right-hand articulation device 2'. The two articulation devices 2, 2' coincide with one another in terms of basic construction and the principal mode of operation. Each articulation device 2, 2' comprises a connecting part A, A' connected rigidly to the seat part 52 and/or to the vehicle body 55 and a fitting part 54, 54' rigidly connected to the backrest 53 and in an articulated manner to the connecting part A, A'—or via a lockable and unlockable inclination adjustment fitting, but which is a locked inclination adjustment fitting when pivoted about the first rotational axis 56.

The two connecting parts A, A' respectively comprise an inner flank plate 3, 3' arranged on one side of the fitting part 54, 54', and an outer flank plate 30, 30' arranged on the other side of the fitting part 54, 54'. The inner flank plate 3, 3' and the outer flank plates 30, 30' of each connecting part A, A' define in the two lateral directions a receiver space, in which a lower portion of the fitting parts 54, 54' is arranged. As a result, a maximum pivoting angle of the fitting part 54, 54' of, for example, up to 30° or of, for example, up to 25° or of, for example, up to 20° is defined. An internal guide pin 5 respectively protrudes from the inner faces 40, 40' of the fitting parts 54, 54' facing one another (of which in FIG. 3 only the left-hand inner guide pin may be seen), which each penetrate a circular inner slotted guide link 6 provided on each inner flank plate 3, 3' (of which in FIG. 3 only the left-hand inner slotted guide link may be seen). Accordingly, one respective outer guide pin 7, 7' (of which in FIG. 3 only the right-hand outer guide pin may be seen) protrudes from the outwardly facing outer faces 41, 41' of the fitting parts 54, 54', which penetrate in each case a circular outer slotted guide link 8' provided on each outer flank plate 30, 30'.

Between the two fitting parts 54, 54' extends an elongate tubular connecting strut 9. The helical springs 10, 10', respectively pressing with an outer projection in each case against one of the inner guide pins 5, 5' (subsequently also denoted as the spring device 10, 10'), exert a force on the fitting part 54, 54', which aims ultimately to move the backrest 53 forward and thus assists the forward movement of the inclination of the backrest 53.

FIG. 4 shows in a perspective view the left-hand articulation device 2, according to FIG. 3, with the left-hand outer flank plate 30 removed. The connecting strut 9 penetrates with an outer portion 90 the left-hand inner flank plate 3. At its free end the connecting strut 9 is fixedly connected in terms of rotation to an articulated tab 11. A locking member 12 is pivotably connected to the connecting strut 9 in an articulated manner about the longitudinal axis of the connecting strut 9. By the connection via the connecting strut 9, the left-hand articulation device 2 is connected to the right-hand articulation device 2' and it is possible that an unlocking of the fitting part 54, 54' about the first rotational axis for both sides takes place at the same time by an actuation (in the present case a rotation) of the connecting strut 9, in the sense of an unlocking of the locking member 12.

A traction spring 13 penetrates a round opening 15 in the region of the free end of the articulated tab 11 with a first spring eye 14. The second spring eye 16 of the traction spring 13 encompasses a connecting pin 17 protruding from the outer surface of the locking member 12 facing outwards. On the locking member 12 a rear fixing hook 18 is provided in the form of a hook recess 18' penetrating the locking member 12 and open to the rear, which is penetrated by the left-hand outer guide pin 7. The rear fixing hook 18 secures the left-hand outer guide pin 7 and thus the left-hand fitting part 54 in the position shown in FIG. 4, so that ultimately the backrest is locked in an upright rear position.

The connecting strut 9, by pulling on the loop S connected via a holder 91 to the connecting strut 9, may be set in rotation about its longitudinal axis indicated by the rotational arrow P. The articulated tab 11 rotating with the connecting strut 9, drives the locking member 12 via the traction spring 13, so that ultimately the rotational movement of the connecting strut 9 causes a rotational movement of the locking member 12. With the rotation of the locking member 12 counter-clockwise, the left-hand rear hook recess 18' is moved away from the left-hand outer guide pin 7, so that the left-hand outer guide pin 7 and the left-hand rear hook recess 18' are brought out of engagement and as a result the locking between the outer guide pin 7 and the rear hook recess 1W is released: the left-hand fitting part 54 and thus the backrest 53 may now be pivoted about the first rotational axis 56 relative to the seat part 52. In a specific inclined position, a left-hand front fixing hook 19 in the form of a left-hand front fixing recess 19' penetrating the locking member 12 provided in the region of the free end of the locking member 12, comes initially into the region of the left-hand outer guide pin 7. By the influence of the force acting on the locking member 12 by the traction spring 13, the left-hand front fixing recess 19' finally comes into engagement with the left-hand outer guide pin 7, so that ultimately the backrest 53 is locked in a position which is slightly inclined to the front.

In a second embodiment of the vehicle seat 51 according to the invention, it is provided that with the rotation of the fitting part 54, 54' about the first rotational axis 56, a simultaneous rotation of the backrest part 53 takes place relative to the fitting part 54, 54', in particular such that the rotational adjustment of the backrest part 53 relative to the vehicle body and/or relative to the seat part 52 is provided substantially unaltered and merely a (non-rotational) pivoting of the backrest part 53 takes place. To this end, for example, it may be provided that an inclination adjustment fitting 61 between the backrest part 53 and the fitting part 54, 54' is opened (not shown). It is, however, also possible according to the invention and shown in FIGS. 5 to 10, that the rotation of the backrest part 53 relative to the fitting part 54, 54' takes place via a four bar linkage mechanism by the aid of a pivot lever 60. In this connection, the pivot lever 60 and the fitting part 54, 54' form two substantially parallel levers (and not directly connected to one another) of the four bar linkage mechanism. The connecting part A, A' fixed to the vehicle body and/or fixed to the seat part and an adapter part 62 on the fitting part side of the inclination adjustment fitting 61 also form two substantially parallel levers (and not directly connected to one another) of the four bar linkage mechanism. The further points of articulation, apart from the first rotational axis 56, of the four bar linkage mechanism are denoted in FIG. 5 by the letters u, v and w. According to the invention, in the second embodiment and by an alteration of the lever lengths of the four bar linkage mechanism it may also be provided that the rotational position of the backrest part 53 relative to the fitting part 54, 54' is altered by a rotation and/or pivoting about the first rotational axis 56.

Figure 7:
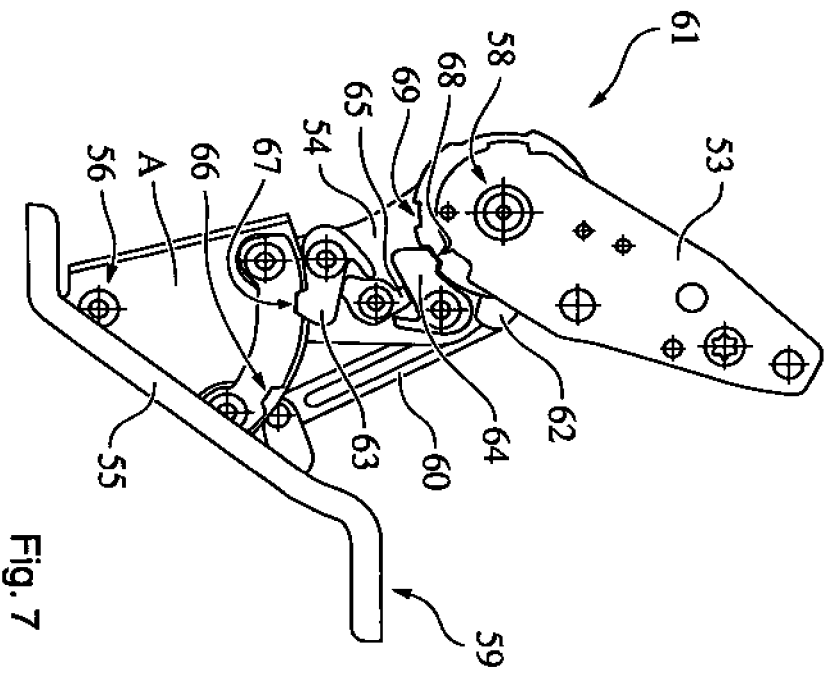
Figure 8:
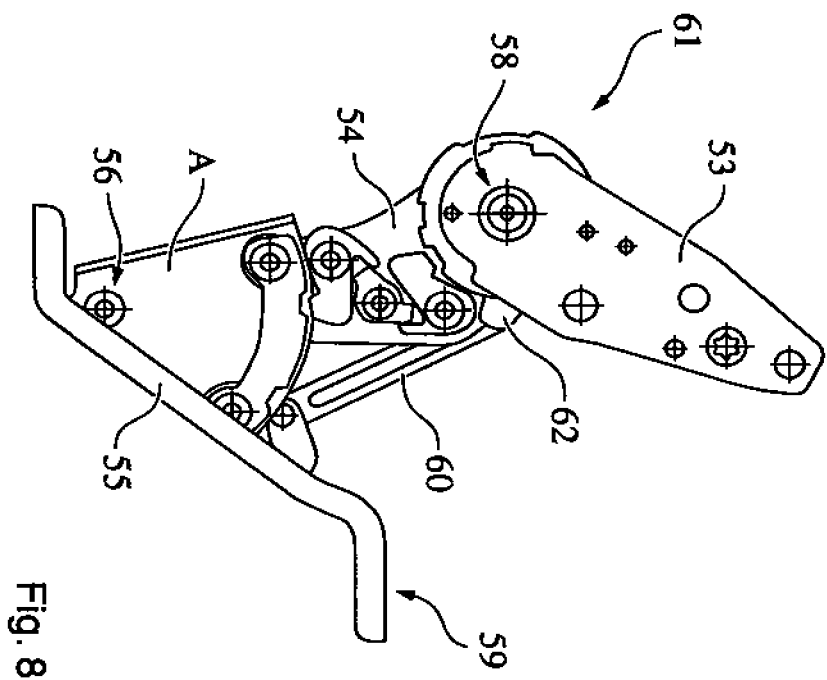

In FIGS. 5 to 10, different positions of the articulation device for the vehicle seat 51 according to the invention are shown according to a second embodiment. In this case, FIGS. 5, 6 and 9 show the adjustment of the fitting part 54, 54' according to the first position, and FIGS. 7, 8 and 10 show the adjustment of the fitting part 54, 54' according to the second position, FIGS. 5 to 8 respectively showing, for example, an internal view of the articulation device and FIGS. 9 and 10 showing in each case an external view of the articulation device (or vice versa).

The difference between FIGS. 5 and 6 and/or 7 and 8 is that the locked state of a locking device for locking the pivoting position of the fitting part 54 about the first rotational axis 56 differs. In FIGS. 5 and 7, the locking device is locked (in each case in different positions). In FIGS. 6 and 8, the locking device is unlocked. To this end, according to the second embodiment (but only shown in FIG. 7) a first locking pawl 63 and a second locking pawl 64 as well as a locking cam 65 are provided on the fitting part 54. A first latching recess 66 and a second latching recess 67 are provided on the connecting part A. A third latching recess 68 and a fourth latching recess 69 are provided on the adapter part 62. In the first position of the fitting part 54 (FIG. 5) the first locking pawl 63 engages in the first latching recess 66 and the second locking pawl 64 in the third latching recess 68. In the second position of the fitting part 54 (FIG. 7) the first locking pawl 63 engages in the second latching recess 67 and the second locking pawl 64 in the fourth latching recess 69. The locking cam 65 is in its locked rotary position. In FIGS. 6 and 8 the locking cam 65 is rotated (in its unlocked rotary position) and unlocks the first locking pawl 63 and the second locking pawl 64. A device corresponding to the connecting strut 9 in the first embodiment for actuation on both sides (and thus one-handed actuation) of the locking device may according to the invention also be provided in the second embodiment (not shown).

In an alternative embodiment of the present invention, the first rotational axis 56 is arranged behind the backrest part 53, for example in comparison with the lower end of the backrest part 53 in a direction obliquely upwards to the rear, as is indicated schematically in FIG. 1, namely by the reference numeral 70. In this case, the fitting part 54 rotates relative to the first and/or second embodiment about the first rotational axis 56 in the reverse direction. A four bar linkage mechanism in this embodiment has to be provided between the fitting part 54 and the backrest 53.

The invention claimed is:

1. A vehicle seat comprising: a seat part, a backrest part and a fitting part, the backrest part and the fitting part being provided in a pivotable fashion relative to the vehicle body about a first rotational axis, wherein the first rotational axis is disposed behind the backrest part, the backrest part is provided to be pivotable relative to the fitting part about a second rotational axis, an inclination adjustment fitting being provided between the fitting part and the backrest, the second rotational axis is arranged above the first rotational axis, a rotational adjustment of the fitting part about the first rotational axis is provided in a first position and in a second position relative to the vehicle body, the first position corresponding to a comfort position and the second position corresponding to a loading position, the rotational adjustment of the fitting part about the first rotational axis is latchable in the first position and in the second position, the backrest part in the first and second positions of the fitting part is oriented about the first rotational axis substantially with a comfort adjustment of inclination, and a rotational adjustment of the backrest part relative to the vehicle body is provided substantially unaltered when pivoting the fitting part about the first rotational axis;

wherein the fitting part comprises:
a first locking pawl configured to block rotation of the fitting part relative to the vehicle body while in a latched position and to facilitate rotation of the fitting part relative to the vehicle body while in an unlatched position;
a second locking pawl configured to block rotation of the backrest part relative to the fitting part while in a latched position and to facilitate rotation of the backrest part relative to the fitting part while in an unlatched position; and
a locking cam configured to concurrently drive the first and second locking pawls into the respective latched positions via rotation of the locking cam in a first direction and to concurrently drive the first and second locking pawls into the respective unlatched positions via rotation of the locking cam in a second direction, opposite the first direction.

2. The vehicle seat as claimed in claim 1, wherein the fitting part forms a four bar linkage together with a pivot lever and a part of the inclination adjustment fitting, the four bar linkage being able to be locked in the first and second position of the fitting part.

3. The vehicle seat as claimed in claim 1, wherein rotational adjustment of the backrest part relative to the fitting part is provided about the second rotational axis in a third position and in a fourth position, the third position corresponding to a normal position and the fourth position corresponding to a folded position.

4. The vehicle seat as claimed in claim 1, wherein the rotational adjustment of the backrest part relative to the fitting part about the second rotational axis in the normal position may be adjusted in a comfort adjustment range either continuously into different positions or into a plurality of positions.

5. The vehicle seat as claimed in claim 1, wherein the seat part is fixedly arranged relative to the vehicle body.

6. The vehicle seat as claimed in claim 1, wherein the vehicle seat is a rear bench seat.

7. The vehicle seat as claimed in claim 1, wherein the second rotational axis is arranged in a region of a seat plane or an extension of a seat plane of the seat part.

8. The vehicle seat as claimed in claim 1, wherein the second rotational axis is arranged above a region of a seat plane or an extension of a seat plane of the seat part.

9. The vehicle seat as claimed in claim 1, wherein comfort adjustment of the inclination is within a range of approximately 20° and 40° from vertical.

10. The vehicle seat as claimed in claim 9, wherein comfort adjustment of the inclination is within a range of approximately 25° and 35° from vertical.

11. The vehicle seat as claimed in claim 1, wherein the first rotational axis is arranged more than 100 mm behind a plane of a leaning surface of the backrest part.

\* \* \* \* \*